J. K. DUGDALE.
HAND CULTIVATOR

No. 176,845. Patented May 2, 1876.

Witnesses:
Benjamin W. Addleman
Benjamin H. Dugdale

Inventor:
James K. Dugdale

UNITED STATES PATENT OFFICE.

JAMES K. DUGDALE, OF WHITE WATER, INDIANA.

IMPROVEMENT IN HAND-CULTIVATORS.

Specification forming part of Letters Patent No. 176,845, dated May 2, 1876; application filed December 20, 1875.

*To all whom it may concern:*

Be it known that I, JAMES K. DUGDALE, of White Water, in the county of Wayne and State of Indiana, have invented a new and useful Improved Hand-Cultivator, the nature of which consists in the employment of removable sliding frames furnished with any approved style of cultivator-teeth, hoes, or rakes, for working the soil, made adjustable, so that they can be raised or lowered to suit the height of the operator, and attached to a frame supported by wheels; and I do hereby declare that the following is a full, clear, and exact description of the same, reference being had to the accompanying drawings, forming a part of this specification, in which—

Figure 1:
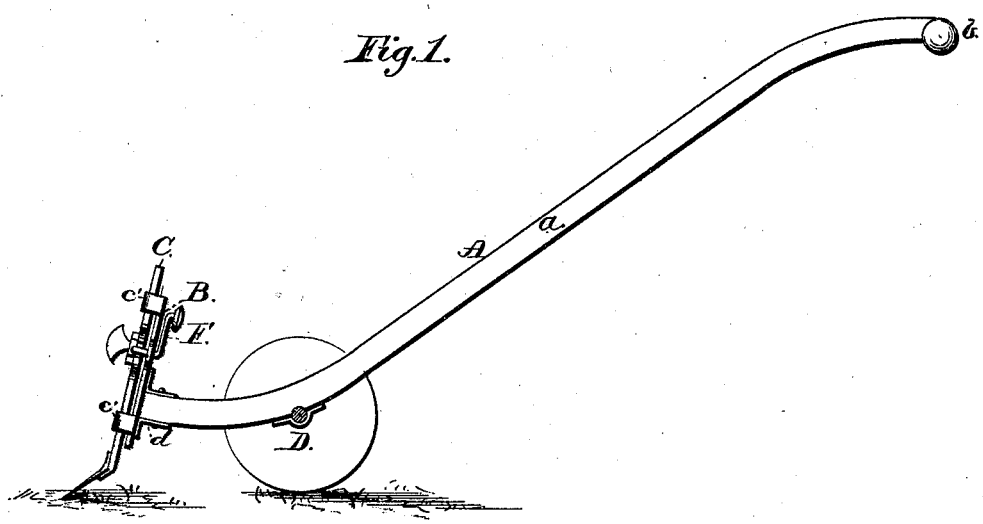
Figure 2:
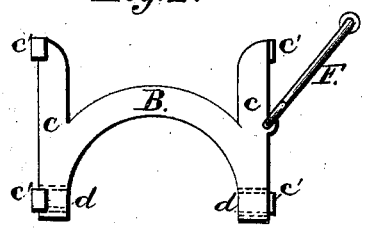
Figure 3:
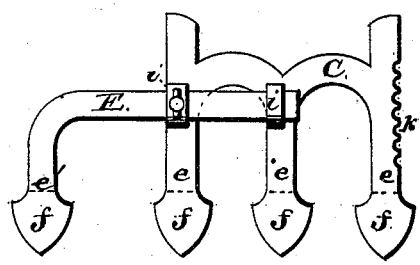
Figure 4:

Figure 1 is a side elevation of my improved hand-cultivator. Most of the parts represented are duplicated on the opposite side. Figs. 2, 3, and 4 are enlarged views of parts hereafter described.

Similar letters of reference indicate corresponding parts.

Letter A, Fig. 1, is a frame consisting of side pieces $a$ $a$, handle $b$, and arched cross-piece B. A front view of this arched cross-piece is shown by Fig. 2. It is in the form of a frame, with vertical bars $c$ $c$ extending above the arch, and provided with sockets $d$ $d$, in which the side pieces $a$ $a$ are inserted. The whole is supported by a wheel, D; or there may be two wheels used. The wheel is placed between the tools and handle at $d'$. This allows the tools to be raised or lowered, to suit the irregularities in the soil, by raising or lowering the handle while pushing the machine along.

The side pieces $a$ $a$ are curved upward from the wheel to frame B, which allows of a smaller wheel and shorter side pieces being used than can be when they are made straight. The handle ends are slightly curved downward for ornament. Other cross-pieces or braces may be added, if needed for strength.

C is an adjustable and removable frame similar in shape to frame B, and may be duplicated and provided with any number of vertical bars desired, and with teeth of any approved style for cultivating the soil, which teeth are attached to the lower ends of the bars by any known method, either permanently or removable, and in a position best suited for the kind of work on hand. A separate frame may be used for each kind of teeth; or one set of teeth may be removed from the frame and replaced by others.

A frame with teeth attached is shown by Fig. 3, in which $e$ $e$ $e$ are the vertical bars, and $f f f$ the cultivator-teeth.

E is a right-angle sliding arm provided with a vertical bar, $e'$, to which a tool is attached. This arm slides under caps $i$ $i$ on frame C, and is held in place by a thumb-screw or spring.

This device is intended to reach over the row, so as to cultivate on both sides of the plants at the same time.

Frame C is held in place against frame B by guides $c'$, attached to standards $c$ of frame B. A sufficient number of these guides are made to lap over in front, so as to hold frame C firmly in position. F is a device composed of a pin, button, and handle. The pin passes through an orifice in one of the bars of frame B, and through notches in one of the bars of frame C, and is turned over in front, forming the button, which button laps over said bar and locks the frames B and C together. This button is turned back and forth by a handle or rod, $h$, which rod is held in place by a catch in rear of frame B. The button, being turned out from the frame, allows the notch to slip off the pin, when the frame may be adjusted either higher or lower, or taken out and another frame put in, as desired. This device is shown by letter F, Fig. 2, and also by Fig. 4, in which $g$ is the pin; $h$, the handle, which handle may be a spring-rod; and $j$, the button.

The notches in frame C are designated by the letter $k$. There may also be notches in the opposite bar to catch on a stationary pin.

This cultivator is operated by pushing it along, or by reversing the position of the teeth by changing the same and pulling it.

Having thus fully described the construction and operation of my improved hand-cultivator, what I claim is—

1. The curved side pieces extended beyond the wheel, in combination with arched frame B, provided with vertical bars *c c* and sockets *d d*, as and for the purpose specified.

2. In combination with frames A and B, provided with guides *c'* and device F, the frame C, provided with notches *k*, as described and set forth.

3. The adjustable arm E, in combination with frame C, as and for the purpose set forth.

4. The device F, serving both as a pin and button, in combination with frame C, having notches *k*, as and for the purpose described.

JAMES K. DUGDALE.

Witnesses:
 BENJAMIN W. ADDLEMAN,
 BENJN. H. DUGDALE.